US012664091B2

(12) United States Patent　　　　(10) Patent No.:　US 12,664,091 B2
Konan　　　　　　　　　　　　　　　(45) Date of Patent:　Jun. 23, 2026

(54) GARBAGE COLLECTION FOR FLASH TRANSLATION LAYER TABLES

(71) Applicant: Micron Technology, Inc., Boise, ID (US)

(72) Inventor: Andrei Konan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 18 days.

(21) Appl. No.: 18/980,736

(22) Filed: Dec. 13, 2024

(65) Prior Publication Data

US 2025/0217284 A1　　Jul. 3, 2025

Related U.S. Application Data

(60) Provisional application No. 63/616,935, filed on Jan. 2, 2024.

(51) Int. Cl.
*G06F 12/02*　　　　(2006.01)
(52) U.S. Cl.
CPC ...... *G06F 12/0253* (2013.01); *G06F 12/0246* (2013.01); *G06F 12/0292* (2013.01)
(58) Field of Classification Search
CPC .............. G06F 12/1009; G06F 12/123; G06F 16/24552; G06F 12/0868; G06F 2212/1024; G06F 2212/1044; G06F 2212/465
USPC ........................................................ 711/154
See application file for complete search history.

(56) References Cited

U.S. PATENT DOCUMENTS

| | | | | |
|---|---|---|---|---|
| 2015/0149697 | A1* | 5/2015 | Salessi | .................. G06F 3/0679 |
| | | | | 711/103 |
| 2017/0017428 | A1 | 1/2017 | Salessi et al. | |
| 2017/0315925 | A1 | 11/2017 | Yeh | |
| 2018/0260132 | A1* | 9/2018 | Wang | ..................... G06F 3/0659 |
| 2019/0340121 | A1 | 11/2019 | Pletka et al. | |
| 2020/0409856 | A1* | 12/2020 | Navon | .................. G06F 12/123 |
| 2022/0027086 | A1* | 1/2022 | Porzio | .................. G06F 3/0679 |
| 2022/0350495 | A1 | 11/2022 | Lee et al. | |
| 2023/0289285 | A1* | 9/2023 | Harris | ................. G06F 12/0868 |

FOREIGN PATENT DOCUMENTS

KR　　　　20170035155　　　　3/2017

OTHER PUBLICATIONS

"International Application Serial No. PCT US2024 060212, International Search Report mailed Apr. 14, 2025", 3 pages.
"International Application Serial No. PCT US2024 060212, Written Opinion mailed Apr. 14, 2025", 3 pages.

* cited by examiner

*Primary Examiner* — Jared I Rutz
*Assistant Examiner* — Wei Ma
(74) *Attorney, Agent, or Firm* — Schwegman Lundberg & Woessner, P.A.

(57)　　　　ABSTRACT

An active drop scheme is selected from multiple drop schemes based on the active drop scheme having an associated drop request. The active drop scheme is associated with a first flash translation layer (FTL) table. A drop group is selected based on the active drop scheme. The drop group includes multiple segments of the first FTL table. The drop group is flushed to a memory device. Mapping information for the drop group is updated in a second FTL table based on flushing the drop group to the memory device.

20 Claims, 9 Drawing Sheets

500

505 ── TRACK DROP REEQUESTS

510 ── SELECT ACTIVE DROP SCHEME

515 ── SELECT DROP GROUP FROM FIRST FTL TABLE BASED ON ACTIVE DROP SCHEME

520 ── FLUSH DROP GROUP

525 ── UPDATE MAPPING INFORMATION FOR DROP GROUP IN SECOND FTL TABLE

500

505

705 — DETECT RANDOM DROP OF SEGMENT OF FTL TABLE

710 — INCREMENT COUNTER ASSOCIATED WITH DROP SCHEME ASSOCIATED WITH THE FTL TABLE

715 — DETERMINE COUNTER SATISFIES THRESHOLD CONDITION

720 — GENERATE DROP REQUEST ASSOCAITED WITH THE DROP SCHEME

510

515

520

525

GARBAGE COLLECTION FOR FLASH TRANSLATION LAYER TABLES

PRIORITY APPLICATION

This application claims the benefit of priority to U.S. Provisional Application Ser. No. 63/616,935, filed Jan. 2, 2024, which is incorporated herein by reference in its entirety.

TECHNICAL FIELD

Embodiments of the disclosure relate generally to memory sub-systems and, more specifically, to techniques for performing garbage collection for flash translation layer (FTL) tables.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
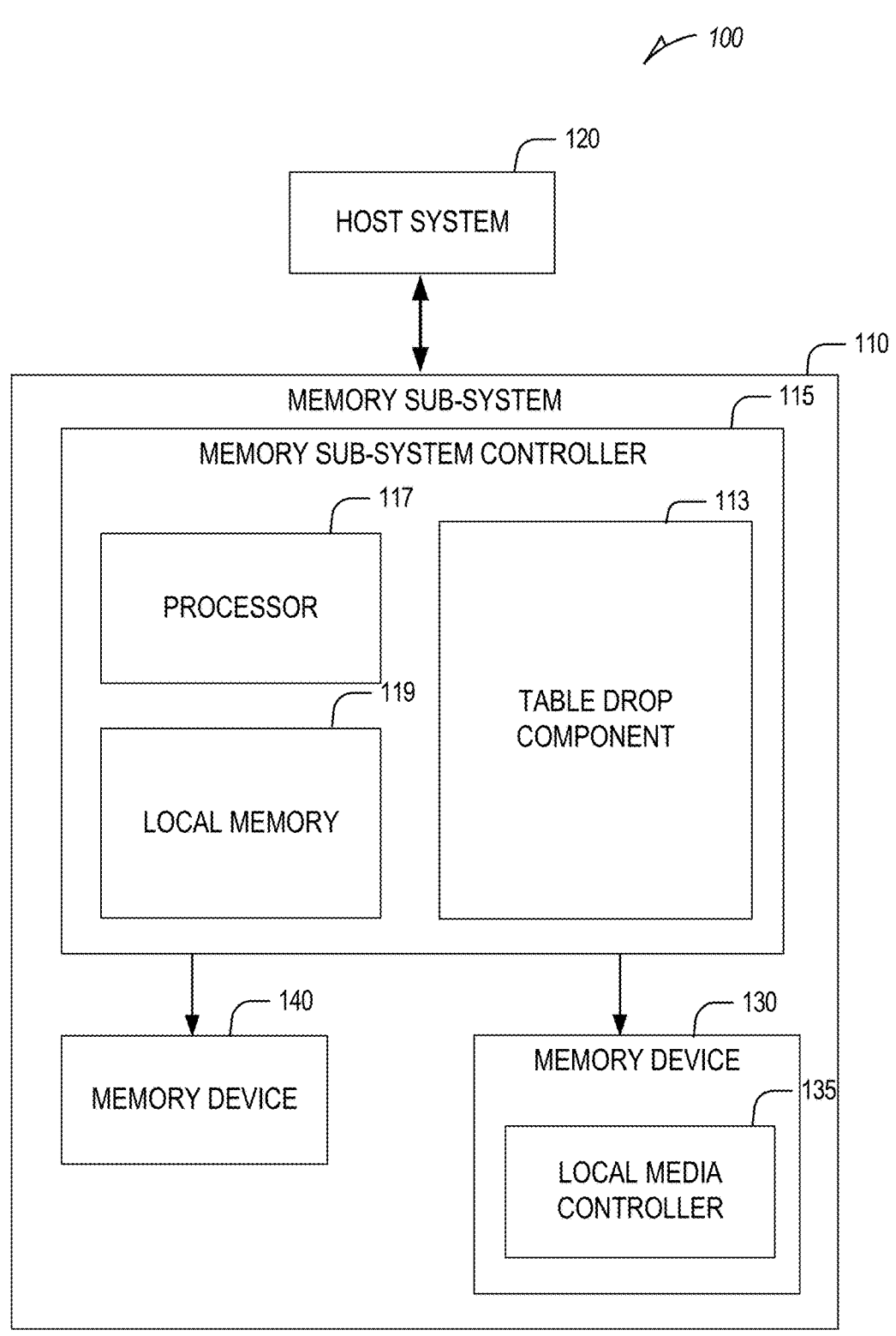
FIG. 1 illustrates an example computing environment that includes a memory sub-system, in accordance with some embodiments of the present disclosure.

Aspects of the present disclosure are directed to an approach for performing garbage collection on a portion of a memory device storing flash translation layer (FTL) tables. A memory sub-system can be a storage device (e.g., solid-state drive (SSD)), a memory module, or a combination of a storage device and memory module. Examples of storage devices and memory modules are described below in conjunction with FIG. 1. In general, a host system can utilize a memory sub-system that includes one or more components, such as memory devices, that store data. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory device can be a non-volatile memory device. One example of a non-volatile memory device is a negative-and (NAND) memory device. A NAND memory device (also referred to herein as "NAND device") can include multiple NAND dies. Each die may include one or more planes, and each plane includes multiple blocks. Each block includes an array that includes pages (rows) and strings (columns). A string includes a plurality of memory cells connected in series. A memory cell (also referred to herein simply as a "cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices such as NAND, memory cells are grouped into an erase unit, such as a physical block, which is a group of pages. A physical block is a memory array of pages (rows of cells) and strings (columns of cells). Data can be written to a block page-by-page. Data can be erased at a block level. However, portions of a block cannot be erased.

Within the context of a memory sub-system, a physical address identifies a physical location of data in a memory device. A logical address is a virtual address that is used by the host system as a reference to access a data unit corresponding to a physical location in the memory device. The data unit may correspond to a block, a page, or a sub-page.

For a NAND memory device, a mechanism, referred to as a flash translation layer (FTL), is typically implemented that writes updated information to a new empty page and redirects all subsequent read requests to its new address. The FTL operates to evenly distribute newly-programmed pages across all of the available memory locations so that NAND structures wear evenly. The FTL also maintains a list of all the old, invalid pages so that later, the old, invalid pages can be reused. The FTL for the NAND device can be implemented in firmware of the memory sub-system.

One of the main tasks of the FTL is to provide a logical-to-physical (L2P) remapping of pages in order to overcome the NAND device constraint of write page granularity vs. erase block granularity. Usually, the FTL maintains an array of addresses, forming an L2P mapping table (also referred to herein as an "FTL table") whose index represents the logical address, while the contents of each entry represent the physical position on the NAND device. Traditionally, an L2P table is stored in a dynamic random-access memory (DRAM) component of the memory sub-system. Consistent with some example implementations, the FTL may utilize a multi-level mapping structure to be able to more quickly reconstruct L2P mappings upon system power-up. For example, the FTL may maintain: a level 2 (L2) table that includes mapping information for user data; a level 1 (L1) table that includes mapping information for the L2 table; and a level 0 (L0) table that includes mapping information for the L1 table. The L0, L1, and L2 tables are maintained in DRAM. The L2 table is the largest FTL table (e.g., gigabytes), the L1 table is smaller (e.g., hundreds of megabytes) although larger than the L0 table, which is the smallest. The L0 table is small enough to be flushed to a dedication location in the NAND device during power loss but the L1 and L2 tables are too large to be fully flushed to the NAND device during power loss.

Garbage collection is a process performed at memory devices to improve write performance. In general, the goal of garbage collection is to increase space and improve efficiency of a memory device by keeping as many empty blocks as possible so that the memory device does not have to wait for a block to be erased before performing a write operation. As an example, when a host system is to write new data to a used block of a memory device, pages in the block with stale data cannot be used until they are erased, though as mentioned above, data is erased at the block level and not at the page level.

As an additional challenge to management of the memory device, a block with pages that contain stale data may include a number of pages that contain valid data. To be able to use the pages with the stale data, garbage collection is performed. With conventional garbage collection techniques, pages containing valid data are copied to an empty block, and the previous block is completely erased before being used again. However, conventional garbage collection techniques can be very resource intensive. For example, freeing up a single block typically requires an average of four blocks to be copied and rewritten. As a result of this amplification factor, four additional garbage collection write operations are performed for each host write operation. While this level of amplification is acceptable for user data, applying the same techniques to FTL tables would require nearly all the resources of the memory sub-system controller, thereby leaving almost no bandwidth for user data write operations.

Aspects of the present disclosure address the above and other issues by utilizing multiple drop schemes to perform garbage collection in relation to FTL tables. In this context, a garbage collection process generally includes flushing one or more segments of an FTL table from DRAM to NAND memory of a memory device. "Flushing" as used herein refers to copying one or more segments of an FTL table from a first memory component (e.g., a DRAM component) to a second memory component (e.g., a NAND memory device). Each of the multiple drop schemes are associated with one of multiple FTL tables (e.g., L2, L1, and L0 mapping tables) and each of the multiple FTL tables are associated with multiple drop schemes. A given drop scheme specifies one or more parameters for dropping one or more segments of a particular FTL table. A "drop" and the operation of "dropping" as used herein refer to flushing one or more segments of an FTL table. As such, the terms "dropping" and "flushing" may be used interchangeably herein.

The parameters defined by a given drop scheme can include: a drop mode, a drop size, and a drop cadence period. The drop mode can be either cadence drop or full drop. A drop performed based on a drop scheme that specifies a full drop mode may also be referred to herein as a "full drop," while a drop performed based on a drop scheme that specifies a cadence drop mode may also be referred to herein as a "cadence drop." The drop size defines a number of segments of the associated FTL table to flush during a single drop. The drop size for full drops is the same as the number of segments of the associated FTL table. The drop cadence defines an interval for performing cadence drops. In general, cadence drops provide gradual persistence during normal operation, while full drops provide immediate, complete persistence during failures or power loss.

In an example, a table drop component of a memory sub-system tracks drop requests associated with multiple FTL tables (e.g., L2, L1, and L0 mapping tables). Drop requests associated with full drop schemes are received as explicit requests (e.g., internal requests from other components of the memory sub-system), while drop requests associated with cadence drop schemes are generated implicitly based on counters tracking random writes.

The table drop component utilizes a round-robin algorithm to select an active drop scheme from the multiple drop schemes that have at least one associated drop request. Based on the active drop scheme, the table drop component selects a drop group that includes multiple segments from a first FTL table to which the active drop scheme is associated. The table drop component flushes the drop group from a DRAM component to a NAND memory device. The table drop component further updates mapping information for drop group from the first FTL table in a second FTL table based on flushing the drop group. Thereafter, the table drop component selects a new active drop scheme and the process is repeated.

The garbage collection techniques for FTL tables discussed herein provide many technical benefits, including enabling different drop modes that are suitable for different situations. For example, cadence drops may be suitable for normal operation, while full drops are useful for situations like power loss. In addition, these techniques allow independent progression of drop cursors for each table, while the round-robin selection of the active drop schemes prevents one table from being starved of resources. Also, these techniques permit prioritizing emergency flushes when needed by pausing cadence drops. Moreover, these techniques provide extensibility given that they enable modular implementation that is agnostic to the number or type of tables, and new drop schemes can be easily and cleanly added.

FIG. 1 illustrates an example computing environment 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 includes a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize a Non-Volatile Memory Express (NVMe) interface to access the memory devices 130 and 140 when the memory sub-system 110 is coupled with the host system 120 by the PCIe or CXL interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 also includes a table drop component 113 that is responsible for performing FTL table drops. An FTL table drop includes flushing (e.g., moving) one or more segments of an FTL table from a DRAM component of the memory sub-system 110 to NAND memory of the memory device 130. In flushing the one or more segments, the table drop component 113 copies the one or more segments of the FTL table from the DRAM component to NAND memory in the memory device 130. The table drop component 113 utilizes multiple drop schemes in performing FTL table drops, as will be discussed in further detail below.

In some embodiments, the memory sub-system controller 115 includes at least a portion of the table drop component 113. For example, the memory sub-system controller 115 can include a processor 117 (processing device) configured to execute instructions stored in local memory 119 (e.g., firmware) for performing the operations described herein. In some embodiments, the table drop component 113 is part of the host system 120, an application, or an operating system. Further details regarding the table drop component 113 are discussed below.

Figure 2:
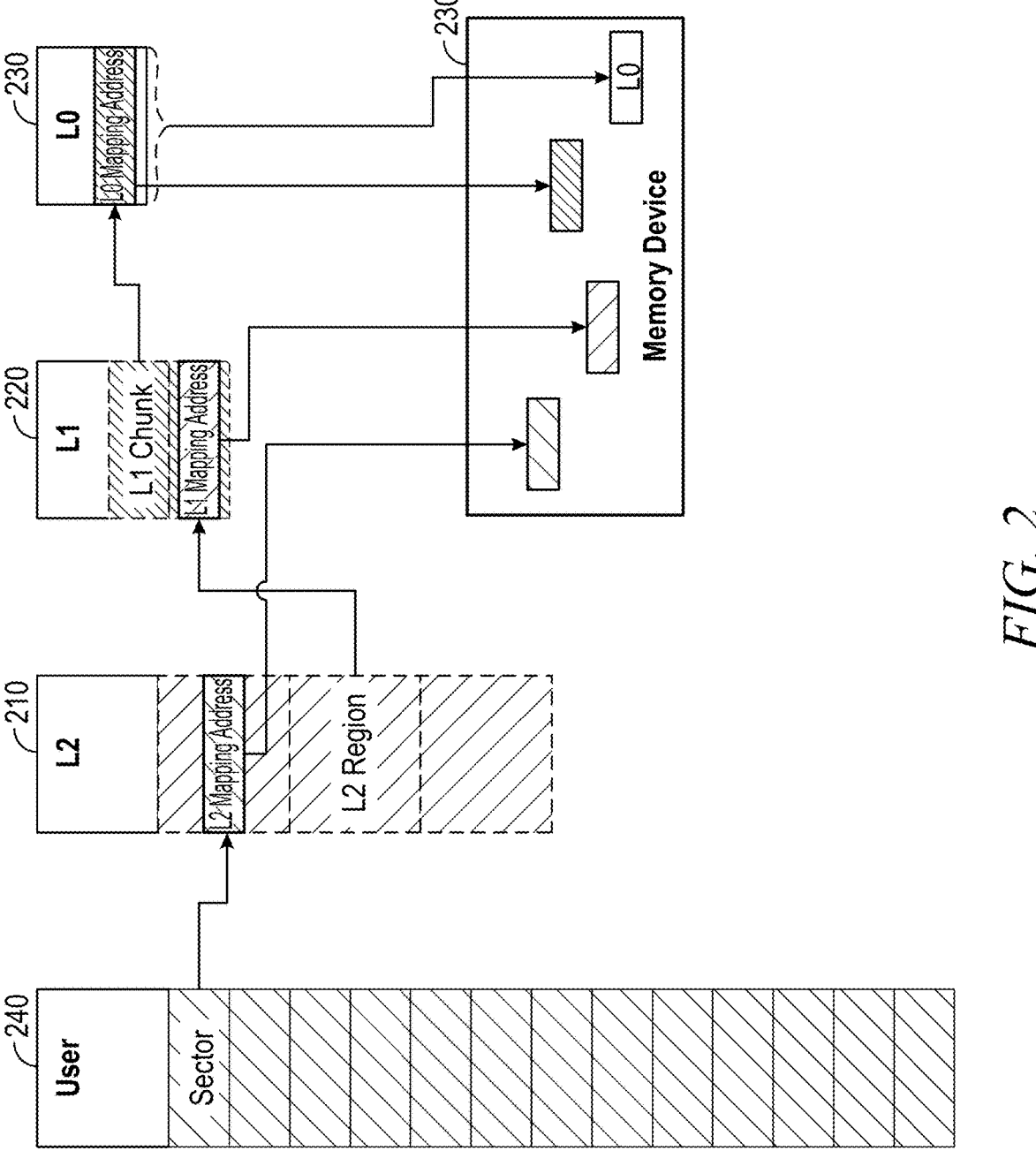
FIG. 2 illustrates example flash translation layer (FTL) tables maintained by the memory sub-system, in accordance with some embodiments of the present disclosure.

FIG. 2 illustrates example FLT tables maintained by the memory sub-system 110, in accordance with some embodiments of the present disclosure. The FTL tables include: a level 2 (L2) table 210, a level 1 (L1) table 220, and a level 0 (L0) table 230. The L0 table 230 is stored in a dedicated area of NAND memory of the memory device 130. For example, the L0 table 230 can be stored in dedicated SLC blocks of the memory device 130. The L0 table 230 does not require garbage collection as it fits easily in the dedicated area in the memory device 130. The L2 table 210 and the L0 table 220 are stored in a DRAM component (e.g., local memory 119 or the memory device 140). The L2 table 210, the L0 table 220, or segments thereof are also maintained in NAND memory of the memory device 130. For example, as logical-to-physical mappings change as a result of ongoing host writes, corresponding segments from the L2 table 210 and the L1 table 220 are immediately flushed to the NAND memory of the memory device 130 via random drops to preserve the latest mappings. Additional examples of dropping segments of the L2 table 210 and the L1 table 220 are discussed below.

The L2 table 210 is a very large mapping table that includes mapping information for user data 240. That is, the L2 table 210 maps logical addresses (e.g., specified in host requests) to physical locations within the memory device 130 where user data is stored.

The L1 table 220 is a smaller mapping table that includes mapping information for the larger L2 table 210. That is, each entry in the L1 table 220 maps to a portion of the L2 table 210. More specifically, each entry in the L1 table 220 points to a location of the corresponding portion of the L2 table 210 in the memory device 130. Thus, the L1 table 220 serves as an intermediate lookup structure to aid in reconstructing the L2 table 210.

The L0 table 230 is the smallest mapping table and includes mapping information for the L1 table 220. That is, each entry in the L0 table 230 indicates a location of a corresponding portion of the L1 table 220 in the memory device 130.

On system power-up, the L0 table 230 is read first to determine the location of portions of the L1 table 220 in the memory device 130. The portions of the L1 table 220 are read from the memory device 130 and reconstructed in local memory 119 to rebuild the L1 table 220. Portions of the L2 table 210 are read from the reconstructed L1 table 220 and the full L2 table 210 is reconstructed. Without the L1 table 220, reconstructing the massive L2 table 210 directly from the tiny L0 table 230 would be very slow and inefficient. The L1 table 220 thereby serves as an acceleration structure, providing a faster reconstruction of the L2 table 210.

Figure 3:
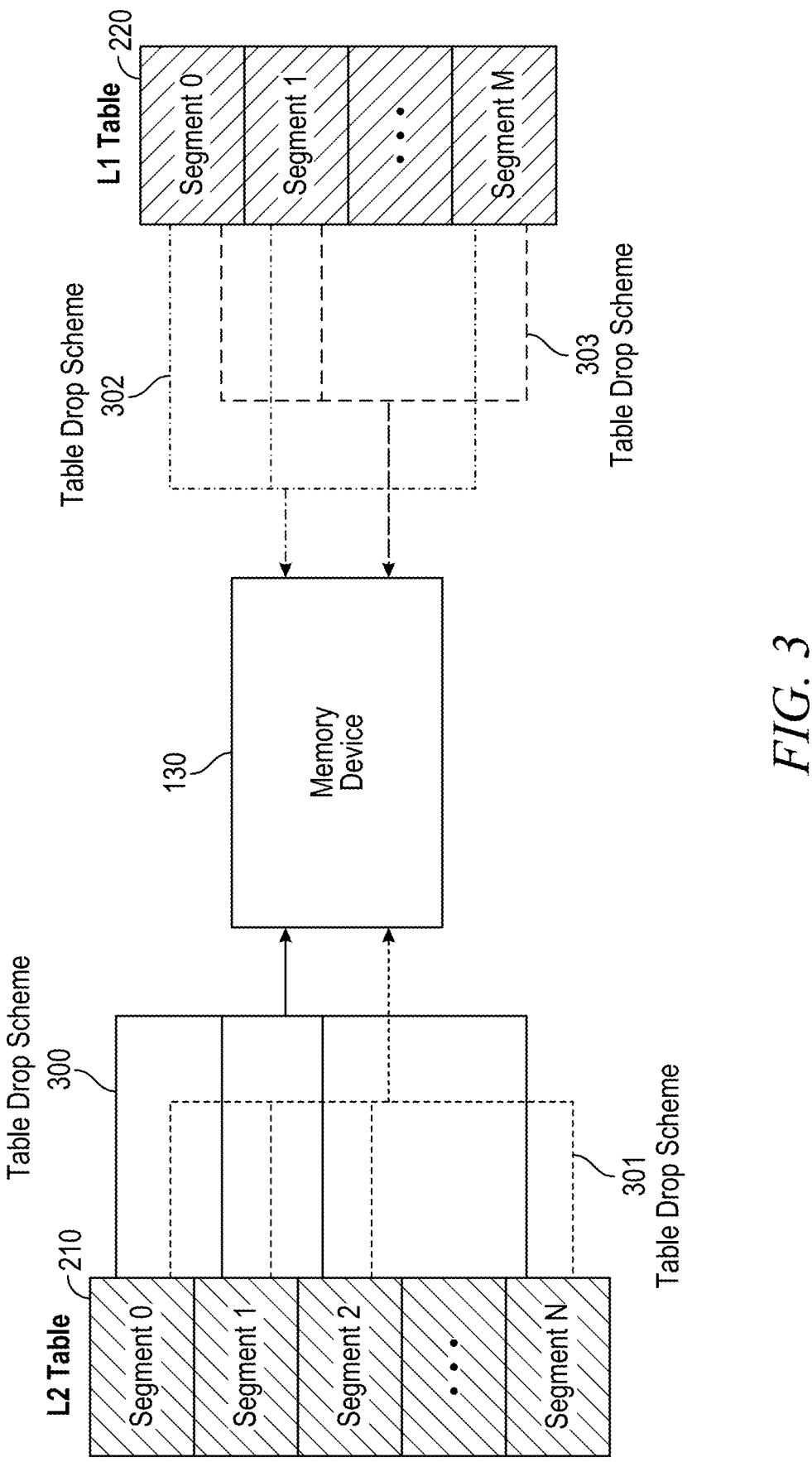
FIG. 3 is a block diagram illustrating an application of multiple drop schemes to each of multiple FTL tables, in accordance with some embodiments of the present disclosure.

FIG. 3 is a block diagram illustrating an application of multiple drop schemes to each of the FTL L2 table 210 and L1 table 220, in accordance with some embodiments of the present disclosure. As shown, drop schemes 300 and 301 are associated with and applied to the L2 table 210 while drop schemes 302 and 303 are associated with and applied to the L1 table 220. Each of the drop schemes 300-303 define parameters for dropping one or more segments of the associated FTL table. That is, drop schemes 300 and 301 define parameters for dropping one or more segments of the FTL table 210 while drop schemes 302 and 303 define parameters for dropping one or more segments of the FTL table 220.

The parameters defined by the drop schemes 300-303 can include a drop mode, a drop size, and a drop cadence period. The drop mode can be either cadence drop or full drop, which will be discussed in further detail below. The drop size defines a number of segments of the associated FTL table to flush to NAND memory of the memory device 130 during a single drop. The drop cadence defines an interval for performing cadence drops.

Figure 4A:
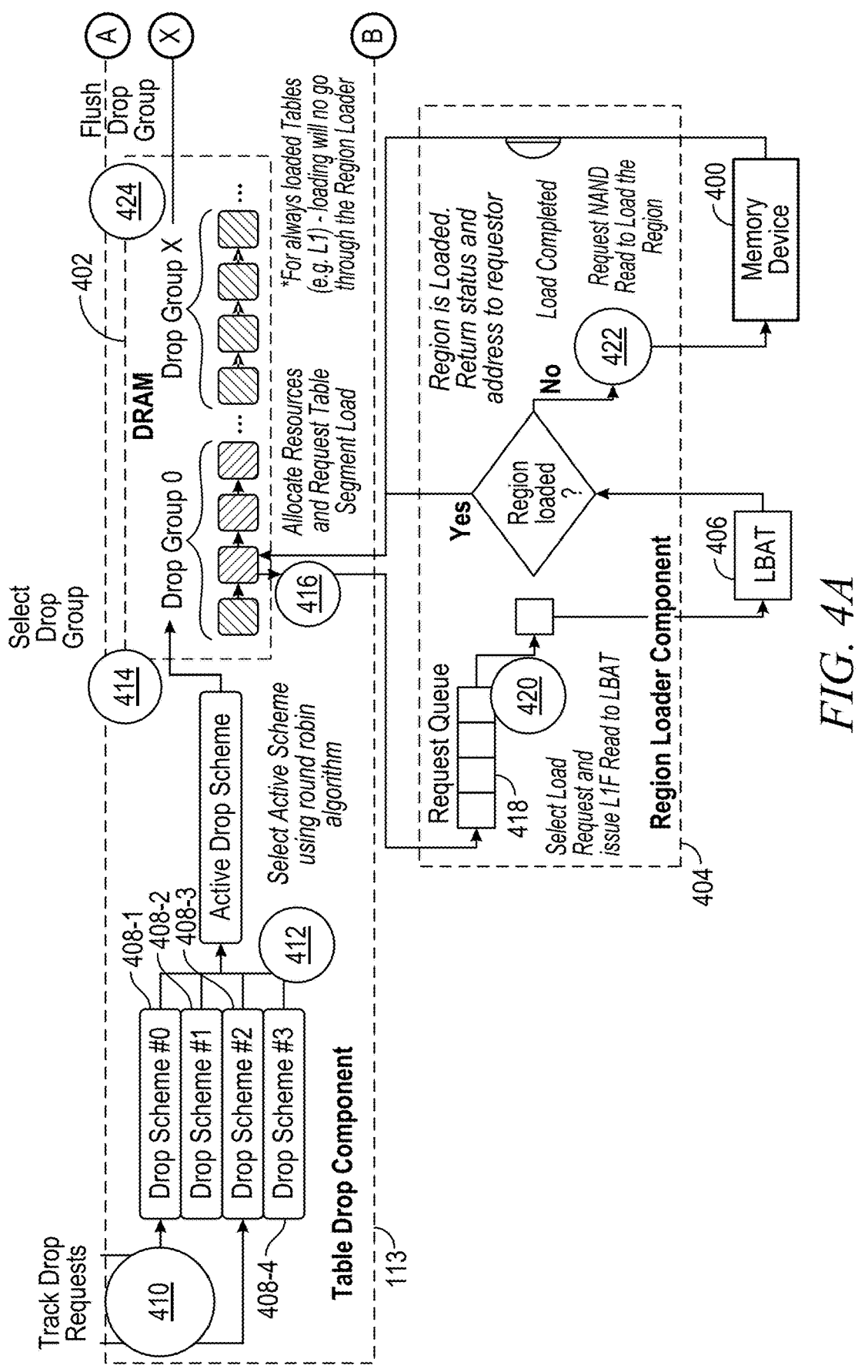
FIGS. 4A and 4B are a data flow diagram illustrating interactions between components in the memory sub-system in performing a method for flushing FTL table segments to a memory device in the memory sub-system, in accordance with some embodiments of the present disclosure.
Figure 4B:
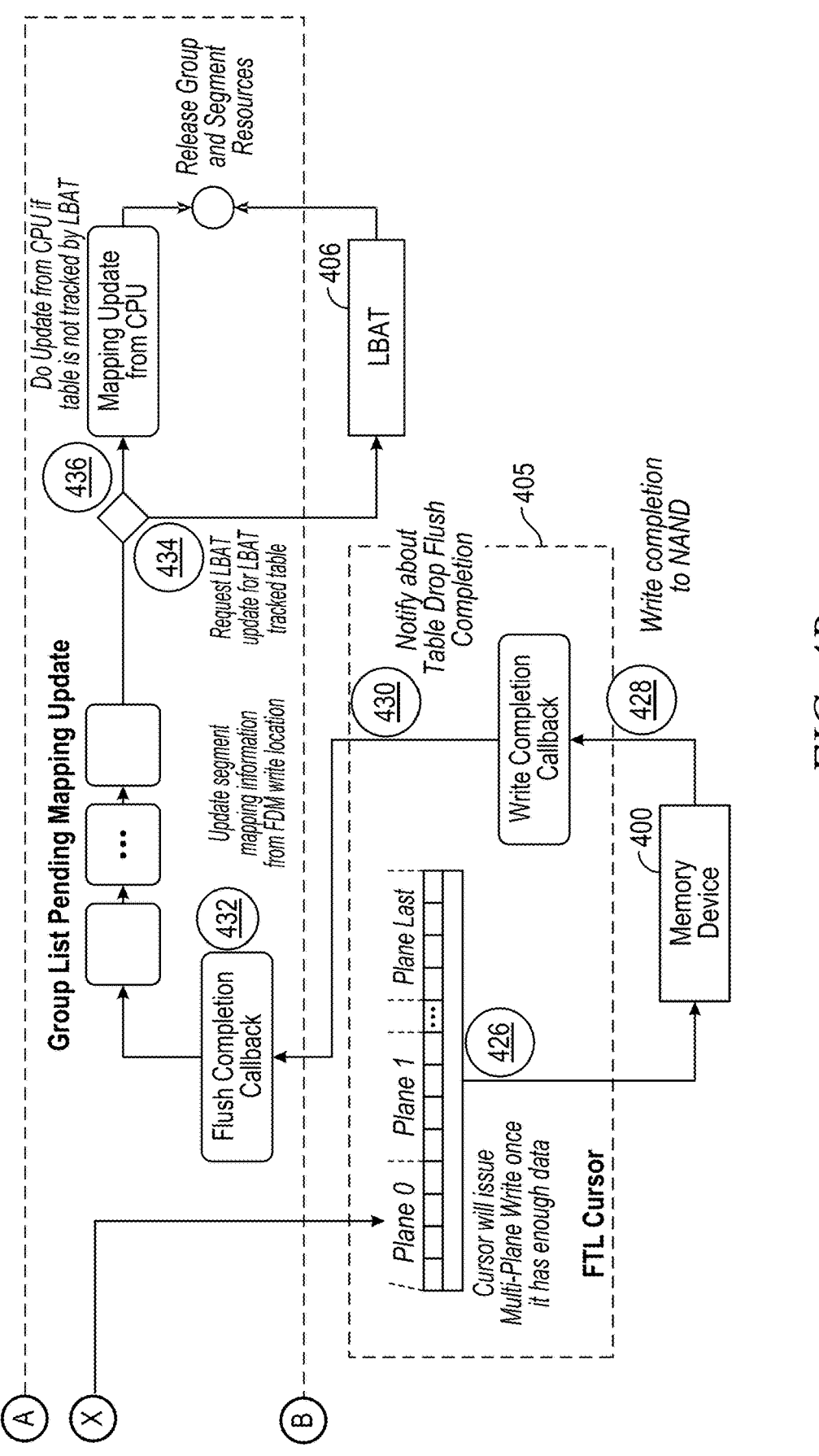

FIGS. 4A and 4B are a data flow diagram illustrating interactions between components in the memory sub-system 110 in performing a method for flushing FTL table segments to a memory device 400 in the memory sub-system 110, in accordance with some embodiments of the present disclosure. In the example illustrated in FIGS. 4A and 4B, the NAND memory device 400 is an of the example memory device 130 described above. The NAND memory device 400 includes multiple NAND dies. Each die may include one or more planes and each plane includes multiple blocks. Each block includes an array that includes pages (rows) and strings (columns). A string includes a plurality of memory cells connected in series. Each memory cell is used to represent one or more bit values. For example, a single NAND flash cell includes a transistor that stores an electric charge on a memory layer that is isolated by oxide insulating layers above and below. Within each cell, data is stored as the threshold voltage of the transistor. SLC NAND, for example, can store one bit per cell. Other types of memory cells, such as MLCs, TLCs, QLCs, and PLCs, can store multiple bits per cell.

In the example illustrated by FIGS. 4A and 4B, the memory sub-system 110 further includes DRAM component 402, a region loader component 404, an FTL cursor 405, and a logical block address table (LBAT) 406. Further details regarding the DRAM component 402, the region loader component 404, the FTL cursor 405, and the LBAT 406 are discussed below.

In addition, in this example, the memory sub-system 110 maintains multiple FTL tables (e.g., FTL tables 210, 220, and 230) and each of the multiple FTL tables is divided into multiple segments. One or more segments of the multiple FTL tables (e.g., FTL tables 210, 220, and 230) are stored in DRAM component 402. The DRAM component 402 may correspond to the local memory 119 of the memory sub-system controller 115 or a second memory device (e.g., the memory device 140) communicatively coupled to the memory sub-system controller 115.

As shown in FIG. 4A, the table drop component 113 maintains multiple drop schemes—drop schemes 408-1 to 408-4. The drop schemes 408-1 to 408-4 are examples of the drop schemes 300-303 discussed above in reference to FIG. 3. Each of the drop schemes 408-1 to 408-4 specifies parameters for dropping one or more segments of a particular FTL table. The parameters of a drop scheme include a drop mode and a drop size. The drop size defines a number of segments to flush during a drop. The drop mode of a drop scheme is either full drop or cadence drop. For example, for drop schemes that specify a full drop, the entire FTL table is to be flushed to the memory device 400. Hence, for full drop mode drop schemes, the drop size is the number of segments in the FTL table associated with the drop scheme. For a cadence drop mode drop scheme, a portion of the FTL table (e.g., one or more segments) is flushed at each drop, and the drop size specifies the size of the portion (e.g., in number of segments). In addition, cadence drop mode drop schemes also specify a drop cadence period that defines an interval for performing drops. The interval specified by the drop cadence period may be based on a number of random drops of segments, pages, or other units of the first FTL table to the NAND memory device. For example, random drops of FTL table segments are performed to persist mapping changes from ongoing host writes, and the drop cadence period of a drop scheme may include a number of random drops that are to trigger a cadence drop.

At operation 410, the table drop component 113 tracks drop requests. Drop requests may either be an explicit request or an implicit request. An explicit drop request is received from the host system 120 and includes a request to drop an entire FTL table.

An implicit request is generated in response to determining a counter associated with a particular drop scheme satisfies a threshold condition. As an example, the table drop component 113 maintains a separate counter for each of the drop schemes that specifies cadence drop as the drop mode. Hence, in accordance with this example, implicit drop requests are associated with drop schemes that specify cadence drop as the drop mode. The table drop component 113 increments a counter associated with a given drop scheme in response to detecting a random drop of a segment of the FTL table associated with the drop scheme. The table drop component 113 can determine the counter satisfies the threshold condition by determining that the counter has reached a threshold number defined by the threshold condition. The threshold number may, for example, be based on the drop cadence period of the drop scheme. The table drop component 113 generates a drop request associated with the drop scheme based on determining that the counter associated with the drop scheme satisfies the threshold condition.

At operation 412, the table drop component 113 selects an active drop scheme from the drop schemes 408-1 to 408-4. The table drop component 113 uses a round-robin algorithm to select the active drop scheme from drop schemes that have at least one associated drop request. The table drop component 113 uses the round-robin algorithm to ensure fair resource allocation among the drop schemes 408-1 to 408-4.

The table drop component 113 selects a drop group based on the active drop scheme, at operation 414. More specifically, the table drop component 113 selects multiple segments from an FTL table associated with the active drop scheme, and the number of segments in the drop group is based on the drop size specified by the active drop scheme. Accordingly, the drop group includes multiple segments of a first FTL table.

If the table drop component 113 determines that one or more segments in the drop group are not loaded to the DRAM component 402, the table drop component 113 sends a load request to the region loader component 404 to load the one or more segments (operation 416). The load request is added to a request queue 418, and at operation 420, the region loader component 404 issues one or more reads to the LBAT 406 to load the region corresponding to the one or more segments. If the one or more segments cannot be loaded from the LBAT 406, the region loader component 404 issues one or more read requests to the memory device 400 to load the region from NAND (operation 422). The LBAT 406 is a hardware accelerator to update the L2 and L1 tables in the DRAM component 402. The LBAT 406 enables direct fetching of such segments from the memory device 130 during power-up rebuild while avoiding having to scan the memory device 130 for the segments.

Once the drop group is loaded to the DRAM component 402, the table drop component 113 flushes the drop group to the memory device 400 (operation 424). That is, the processing device moves the segments of the first FTL table of the drop group from the DRAM component 402 to the memory device 400. With reference to FIG. 4B, to flush the drop group to the memory device 400, the table drop component 113 sends one or more requests to the FTL cursor 405, and the FTL cursor 405, in turn, issues one or more write commands to the memory device 400 to write the multiple segments of the first FTL table to NAND memory of the memory device 400 (operation 426). Once the multiple segments of the first FTL table (the drop group) are successfully written, the memory device 400 provides a notification of the write completion to the FTL cursor 405 (operation 428), and the FTL cursor 405, in turn, provides a notification of flush completion to the table drop component 113 (operation 430).

At operation 432, the table drop component 113 generates updated mapping information for the drop group and uses the updated mapping information to update a second FTL table based on flushing the drop group to the memory device. The updated mapping information identifies a physical location of the multiple segments of the drop group in the memory device 400 (e.g., a physical location within a NAND block of the memory device 400). The table drop component 113 updates the second FTL table by either sending one or more requests to the LBAT 406 (operation 434), which in turn updates the second FTL table, or by sending one or more requests to a central processing unit (CPU) (operation 436), which in turn updates the second FTL table.

In an example of the foregoing and with reference to FIG. 2, the L2 table 210 and the L1 table 220 are tracked and accessed via the LBAT 406 while the L0 table 230 is tracked and accessed by the CPU. In accordance with this example, in instances in which the first FTL table is the L2 table 210, the table drop component 113 sends one or more requests to the LBAT 406 to update the mapping information for the L2 table 210 in the L1 table 220. In addition, in instances in which the first FTL table is the L1 table 220, the table drop component 113 sends one or more requests to the CPU to update the mapping information for the L1 table 220 in the L0 table 230.

Figure 5:
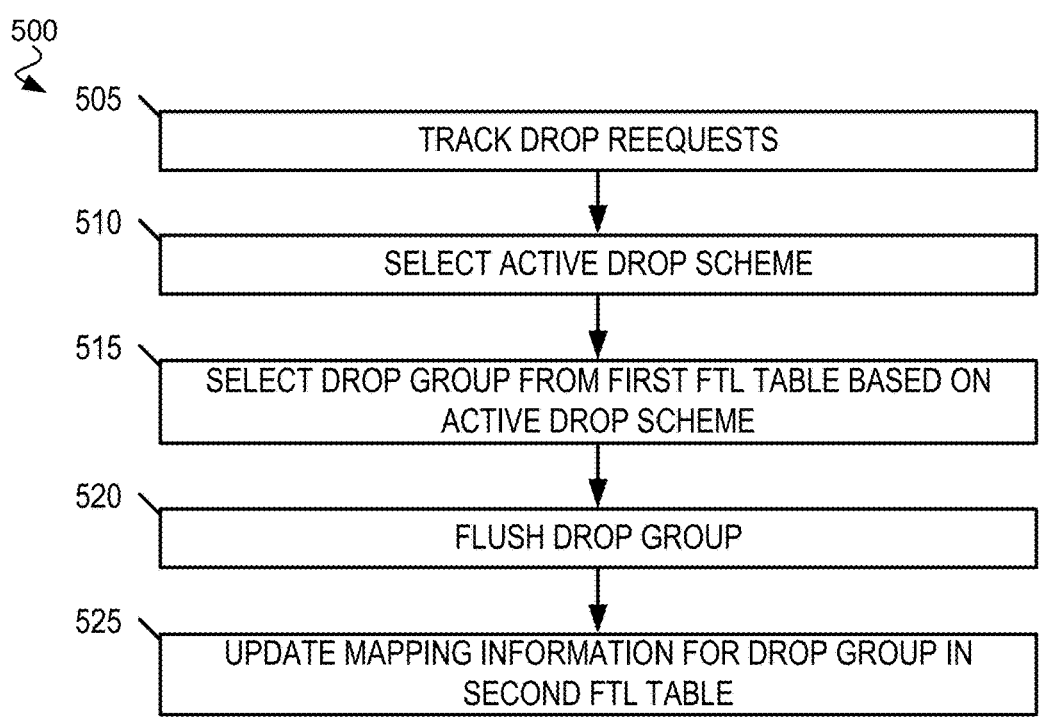
FIGS. 5-7 are flow diagrams illustrating an example method for flushing FTL table segments to a memory device in a memory sub-system, in accordance with some embodiments of the present disclosure.
Figure 6:
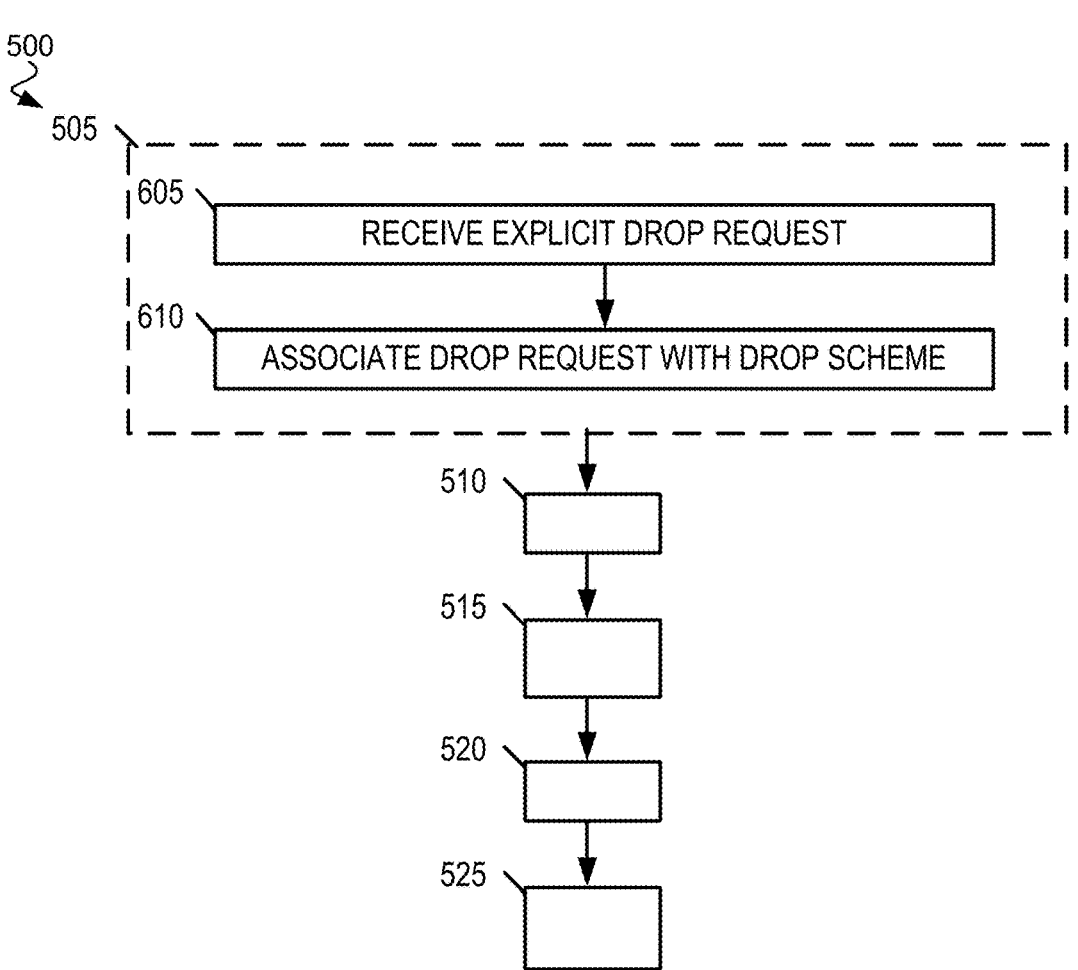
Figure 7:
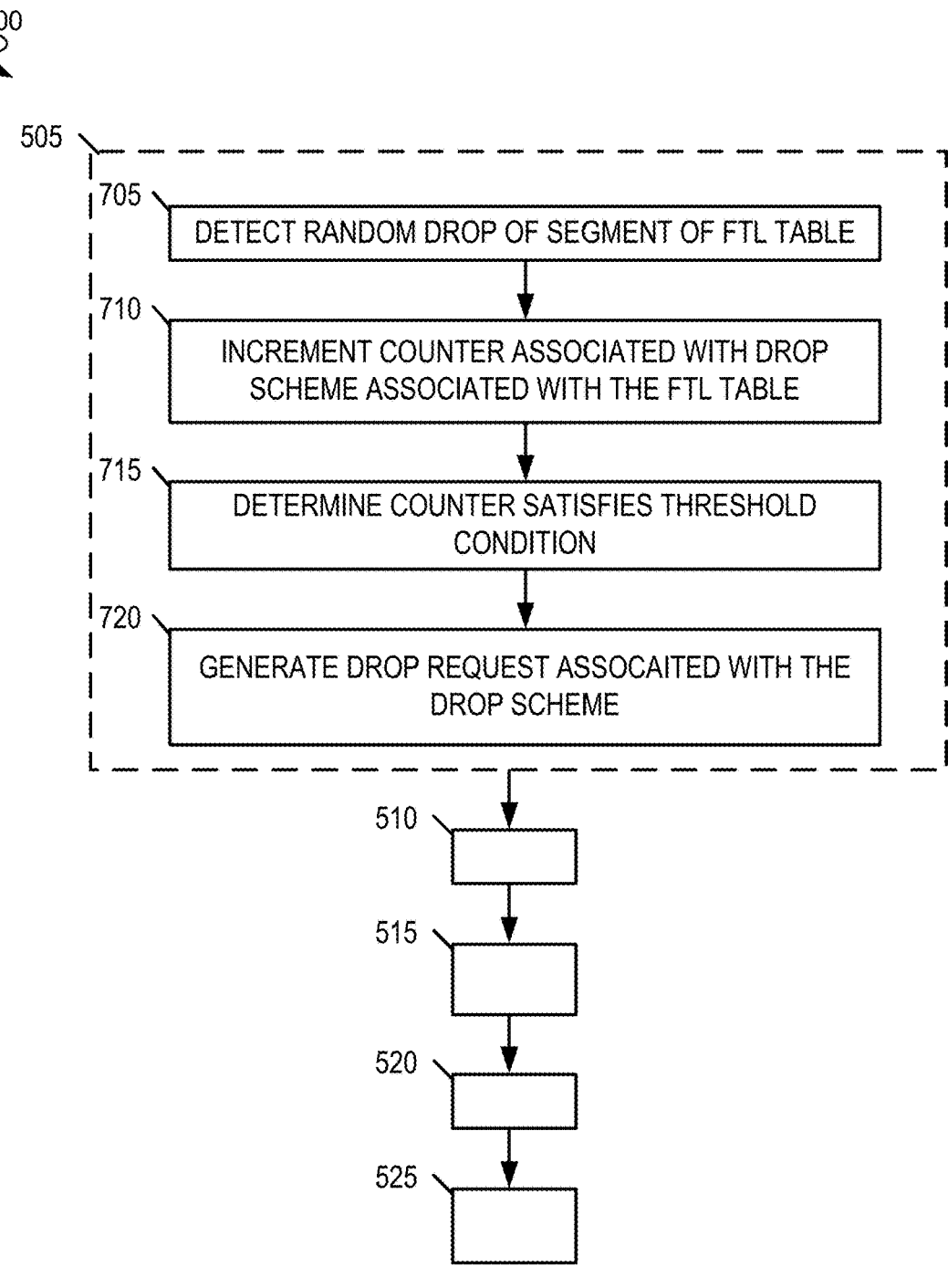

FIGS. 5-7 are flow diagrams illustrating an example method 500 for flushing FTL table segments to a memory device, in accordance with some embodiments of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the table drop component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As context for the method 500, multiple FTL tables (e.g., FTL tables 210, 220, and 230) or at least segments thereof are stored by a DRAM component (e.g., the DRAM component 402). The processing device may be communicatively coupled to the DRAM component, or the DRAM component may form part of the processing device.

At operation 505, the processing device tracks drop requests associated with multiple drop schemes. Drop requests may be either explicit requests or implicit requests. An explicit drop request is an internal request received from another memory sub-system component to drop an entire FTL table. An implicit request is generated in response to determining that a counter associated with a particular drop scheme satisfies a threshold condition. Further details regarding generation of implicit drop requests are discussed below.

At operation 510, the processing device selects an active drop scheme from the multiple drop schemes. The processing device selects the active drop scheme from the multiple drop schemes using a round-robin algorithm to prevent resource starvation for any one drop scheme and to ensure a fair allocation of resources between drop schemes. Each drop scheme is associated with an FTL table (e.g., one of FTL tables 210, 220, or 230). That is, each drop scheme specifies parameters for dropping one or more segments of a particular FTL table. Multiple drop schemes can be associated with a single FTL table. The active drop scheme is associated with a first FTL table.

Each drop scheme also specifies a drop mode. The drop mode of a drop scheme is either full drop or cadence drop. For example, for a full drop, the drop scheme specifies that the entire FTL table is to be flushed, while for cadence drop schemes, only a subset of the FTL table (e.g., one or more segments) is flushed at each drop.

Each drop scheme also specifies a drop size. The drop size specifies a number of segments to flush to a NAND memory device at each drop. In an example, the drop mode of the active drop scheme is full drop and the drop size corresponds to the size of the first FTL table. In another example, the drop mode of the active drop scheme is cadence drop and the drop size specifies a number of segments of the first FTL table to flush to NAND memory (e.g., the memory device 130).

Drop schemes that specify a cadence drop also specify a drop cadence period that defines an interval for performing drop of segments of the corresponding FTL table. In an example, the drop mode of the active drop scheme is cadence drop and the active drop scheme specifies a cadence drop period that defines an interval for performing drop of segments of the first FTL table. The interval specified by the drop cadence period may be based on a number of random drops of segments, pages, or other units of the first FTL table to the NAND memory device. In some implementations, the number of random drops specified by the drop cadence period is based on a table size (in number of segments), a maximum table span (in number of blockstripes), and pages per blockstripe. More specifically, in these implementations the cadence drop period can be determined according to the following formula:

$$\text{Drop Period} = \text{Max Table Span} * (\text{Pages per blockstripe/table size})$$

12

In an example, the first FTL table has 9 segments, a maximum table space of 3 block stripes, and 12 pages per blockstripe. In this example, the cadence drop period is 4 pages ($3*12/9=4$).

The active drop scheme has at least one associated drop request. In an example, the drop mode of the active drop scheme is full drop, and a drop request associated with the active drop scheme is an explicit drop request (e.g., an internal request received from another memory sub-system component). In another example, the drop mode of the active drop scheme is cadence drop, and a drop request associated with the active drop scheme is generated based on determining that a counter associated with the drop scheme satisfies a threshold constraint. The counter associated with the active drop scheme is incremented in response to each random drop of a segment of the first FTL table. That is, the counter is updated each time a segment of the first FTL table is flushed from a DRAM component to a NAND memory device. In this example, the threshold constraint includes a threshold number based on the cadence drop period of the active drop scheme, and determining that the counter associated with the active drop scheme satisfies the threshold constraint includes determining that the counter has reached the threshold number.

At operation 515, the processing device selects a drop group based on the active drop scheme. The drop group comprises one or more segments of the first FTL table. In an example, the drop mode of the active drop scheme is full drop, and the processing device selects all segments of the first FTL table as the drop group. That is, the processing device selects the entirety of the first FTL table as the drop group. In another example, the drop mode of the active drop scheme is cadence drop, and the processing device selects the number of segments of the first FTL table specified by the drop size of the active drop scheme for the drop group. Particular segments selected by the processing device in this example are based on a cursor position in a flushing table (e.g., used to track flush status of table segments) that is sequentially incremented at each flush.

At operation 520, the processing device flushes the drop group to the memory device. That is, the processing device copies the segments of the first FTL table of the drop group from the DRAM component to the memory device (e.g., to one or more NAND blocks of the memory device).

At operation 525, the processing device updates mapping information for the drop group in a second FTL table based on flushing the drop group to the memory device. In an example, the processing device updates one or more entries in the second FTL table with updated mapping information that identifies a physical location of one or more segments of the drop group in the memory device (e.g., a physical location within a NAND block of the memory device).

As shown in FIG. 6, the method 500 can, in some examples, include operations 605 and 610. Consistent with these examples, the operations 605 and 610 may be performed as part of or prior to operation 505 where the processing device tracks drop requests.

At operation 605, the processing device receives an explicit drop request. The explicit drop request includes a request to drop a particular FTL table from the multiple FTL tables in its entirety.

At operation 610, the processing device associates the drop request with a particular drop scheme among the multiple drop schemes based on the particular FTL table to which the request is directed. More specifically, the processing device associates the drop request with a drop scheme that is associated with the same FTL table to which the request is directed and that specifies full drop as the drop mode. In an example, the explicit drop request is to drop the first FTL table that is associated with the drop scheme selected as the active drop scheme. In this example, the active drop scheme specifies full drop as the drop mode.

As shown in FIG. 7, the method 500 can, in some examples, include operations 705, 710, 715, and 720. Consistent with these examples, the operations 705, 710, 715, and 720 may be performed as part of or prior to operation 505 where the processing device tracks drop requests.

At operation 705, the processing device detects a random dump of a segment of an FTL table from among the multiple FTL tables. As an example, random dumps are performed to persist mapping changes from ongoing host writes.

Based on detecting the random dump of the segment of the FTL table, the processing device, at operation 710, increments a counter associated with a drop scheme that is associated with the FTL table and specifies cadence drop as the drop mode.

The processing devices determines that the counter satisfies a threshold condition, at operation 715. In an example, the threshold condition includes a threshold number, and determining that the counter satisfies the threshold condition includes determining that the counter has reached the threshold number. In some example, the threshold number is based on the drop cadence period of the drop scheme.

At operation 720, the processing device generates a drop request associated with the drop scheme based on determining that the counter associated with the drop scheme satisfies the threshold condition.

Example 1 is a memory sub-system comprising a memory device and a processing device operatively coupled with the memory device to perform operations including: selecting an active drop scheme from multiple drop schemes based on the active drop scheme having an associated drop request, where the active drop scheme defines parameters for dropping segments of a first flash translation layer (FTL) table; selecting a drop group comprising multiple segments of the first FTL table based on the active drop scheme; flushing the drop group to the memory device; and updating mapping information for the drop group in a second FTL table based on flushing the drop group.

Example 2 includes the subject matter of Example 1, with the optional additional feature of receiving the drop request associated with the active drop scheme.

Example 3 includes the subject matter of any one of Examples 1 or 2, with the optional additional feature of the drop group comprising the first FTL table in its entirety.

Example 4 includes the subject matter of any one of Examples 1-3, with the optional additional feature of the associated drop request being generated in response to determining that a counter associated with the active drop scheme satisfies a threshold constraint.

Example 5 includes the subject matter of any one of Examples 1-4, with the optional additional feature of incrementing a counter associated with the active drop scheme based on detecting a random drop of the first FTL table comprising flushing a segment to the memory device.

Example 6 includes the subject matter of any one of Examples 1-5, with the optional additional features of: the active drop scheme specifying a cadence drop period defining an interval for dropping segments; the threshold constraint comprising a threshold number based on the cadence period; and determining the counter reaches the threshold number.

Example 7 includes the subject matter of any one of Examples 1-6, with the optional additional feature of selecting the active drop scheme based on a round-robin algorithm.

Example 8 includes the subject matter of any one of Examples 1-7, with the optional additional feature of each drop scheme specifying either a cadence drop mode or a full drop mode.

Example 9 includes the subject matter of any one of Examples 1-8, with the optional additional features of: the active drop scheme specifying a drop group size for the number of segments to flush; and the drop group comprising the specified number of segments.

Example 10 includes the subject matter of any one of Examples 1-9, with the optional additional feature of a DRAM component storing the first FTL table, and where flushing the drop group copies segments from the DRAM component to the memory device.

Example 11 includes the subject matter of any one of Examples 1-10, with the optional additional features of: determining one or more drop group segments are not loaded on the DRAM component; and loading those segments onto the DRAM component.

Example 12 is a method comprising: tracking drop requests for multiple drop schemes; selecting an active drop scheme having an associated request that defines dropping segments of a first FTL table; selecting a drop group comprising segments of the first FTL table based on the active scheme; flushing the drop group to a memory device; and updating mapping information for the drop group in a second FTL table.

Example 13 includes the subject matter of Example 12, with the optional additional feature of receiving the drop request associated with the active drop scheme from a host system.

Example 14 includes the subject matter of Example 13, with the optional additional feature of the drop group comprising the first FTL table in its entirety.

Example 15 includes the subject matter of any one of Examples 12-14, with the optional additional feature of the associated drop request being generated in response to determining that a counter associated with the active drop scheme satisfies a threshold constraint.

Example 16 includes the subject matter of Example 15, with the optional additional feature of incrementing the counter associated with the active drop scheme based on detecting a random drop of the first FTL table comprising flushing a segment to the memory device.

Example 17 includes the subject matter of Example 15 or 16, with the optional additional features of: the active drop scheme specifies a cadence drop period defining an interval for dropping segments; the threshold constraint comprises a threshold number based on the cadence period; and determining the counter reaches the threshold number.

Example 18 includes the subject matter of any one of Examples 12-17, with the optional additional feature of selecting the active drop scheme based on a round-robin algorithm.

Example 19 includes the subject matter of any one of Examples 12-18, with the optional additional features of: the active drop scheme specifies a drop group size for the number of segments to flush; and the drop group comprises the specified number of segments.

Example 20 is a computer-readable storage medium comprising instructions that configure a processing device to perform operations including: tracking multiple drop requests associated with drop schemes for dropping segments of a first FTL table; selecting a first drop scheme as active based on an associated request; selecting a drop group comprising segments of the first FTL table based on the active scheme; flushing the drop group to a memory device; and updating mapping information for the drop group in a second FTL table.

Figure 8:
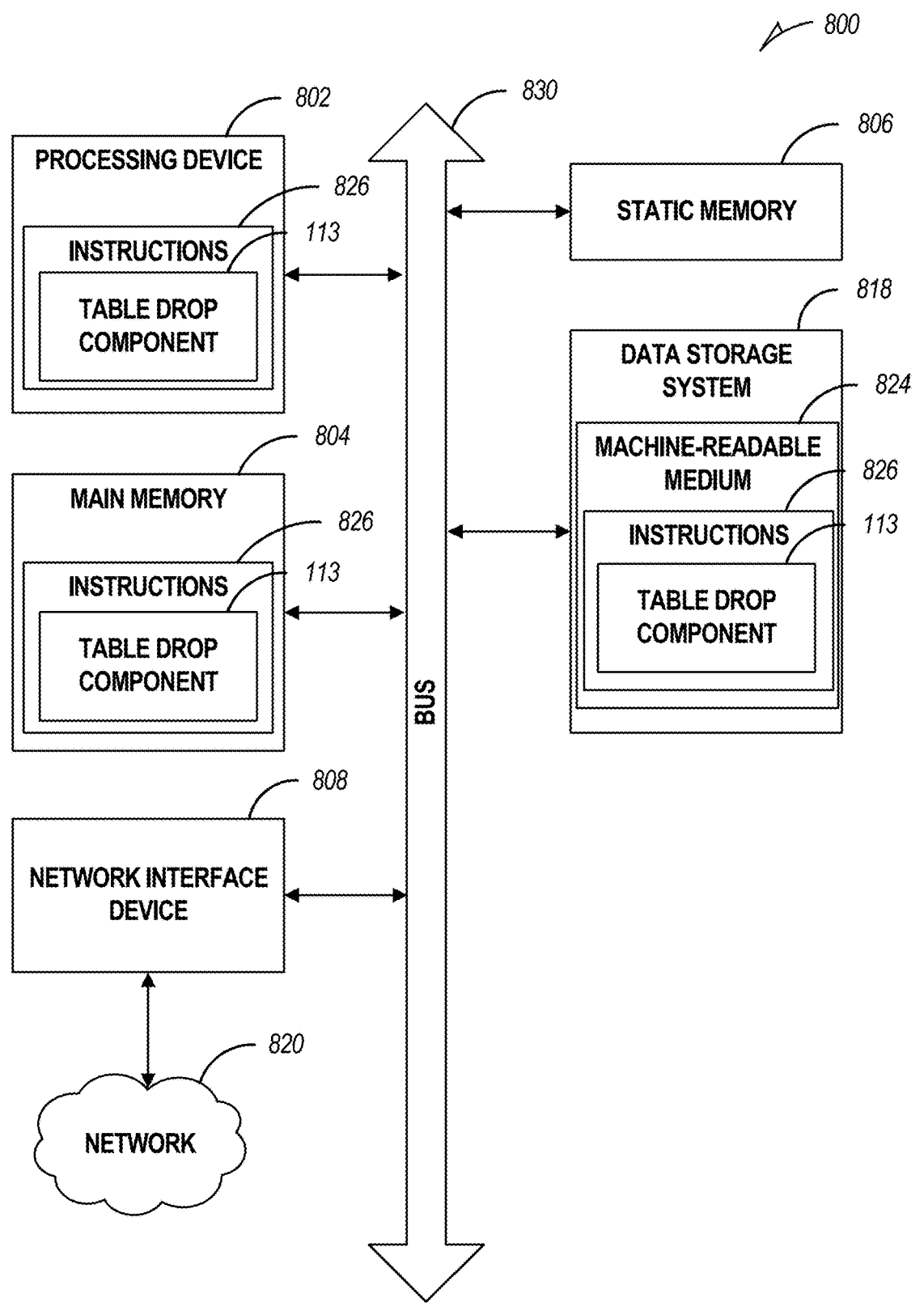
FIG. 8 is a block diagram of an example computer system in which embodiments of the present disclosure may operate.

FIG. 8 illustrates an example machine in the form of a computer system within which a set of instructions can be executed for causing the machine to perform any one or more of the methodologies discussed herein. FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the table drop component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., ROM, flash memory, DRAM such as SDRAM or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an ASIC, a FPGA, a digital signal processor (DSP), network processor, or the like. The processing device 802 is configured to execute instructions 826 for performing the operations and steps discussed herein. The computer system 800 can further include a network interface device 808 to communicate over a network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a security component (e.g., the table drop component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device; and
a processing device, operatively coupled with the memory device to perform operations comprising:
selecting an active drop scheme from multiple drop schemes based on the active drop scheme having an associated drop request, the active drop scheme defining parameters for dropping one or more segments of a first flash translation layer (FTL) table;
selecting a drop group based on the active drop scheme, the drop group comprising multiple segments of the first FTL table;
flushing the drop group to the memory device; and
updating mapping information for the drop group in a second FTL table based on flushing the drop group to the memory device.

2. The memory sub-system of claim 1, wherein the operations further comprise receiving the drop request associated with the active drop scheme.

3. The memory sub-system of claim 2, wherein the drop group comprises the first FTL table in its entirety.

4. The memory sub-system of claim 1, wherein the associated drop request is generated in response to determining that a counter associated with the active drop scheme satisfies a threshold constraint.

5. The memory sub-system of claim 4, wherein the operations further comprise incrementing the counter associated with the active drop scheme based on detecting a random drop of the first FTL table to the memory device, the random drop of the first FTL table comprising flushing a segment of the first FTL table to the memory device.

6. The memory sub-system of claim 4, wherein:
the active drop scheme specifies a cadence drop period, the cadence drop period defining an interval for performing drops of segments of the first FTL table;
the threshold constraint comprises a threshold number based on the cadence drop period; and determining that the counter associated with the active drop scheme satisfies the threshold constraint comprises determining that the counter has reached the threshold number.

7. The memory sub-system of claim 1, wherein the selecting of the active drop scheme from among the multiple drop schemes is based on a round-robin algorithm.

8. The memory sub-system of claim 1, wherein each drop scheme of the multiple drop schemes specifies a drop mode selected from a group comprising: cadence drop and full drop.

9. The memory sub-system of claim 1, wherein:
the active drop scheme specifies a drop group size, the drop group size specifying a number of segments to flush to the memory device; and
the drop group comprises the number of segments.

10. The memory sub-system of claim 1, further comprising a dynamic random-access memory (DRAM) component to store the first FTL table, wherein the flushing of the drop group comprises copying the multiple segments for the first FTL table from the DRAM component to the memory device.

11. The memory sub-system of claim 10, wherein the operations further comprise:
determining one or more segments of the multiple segments of the FTL table are not loaded on the DRAM component; and
loading the one or more segments on the DRAM component.

12. A method comprising:
tracking, by a processing device, drop requests associated with multiple drop schemes;
selecting, by the processing device, an active drop scheme from the multiple drop schemes based on the active drop scheme having an associated drop request, the active drop scheme defining parameters for dropping one or more segments of a first flash translation layer (FTL) table;
selecting, by the processing device, a drop group based on the active drop scheme, the drop group comprising multiple segments of the first FTL table;
flushing, by the processing device, the drop group to a memory device; and
updating, by the processing device, mapping information for the drop group in a second FTL table based on flushing the drop group to the memory device.

13. The method of claim 12, further comprising receiving the drop request associated with the active drop scheme.

14. The method of claim 13, wherein the drop group comprises the first FTL table in its entirety.

15. The method of claim 12, wherein the associated drop request is generated in response to determining that a counter associated with the active drop scheme satisfies a threshold constraint.

16. The method of claim 15, further comprising incrementing the counter associated with the active drop scheme based on detecting a random drop of the first FTL table to the memory device, the random drop of the first FTL table comprising flushing a segment of the first FTL table to the memory device.

17. The method of claim 15, wherein:
the active drop scheme specifies a cadence drop period, the cadence drop period defining an interval for performing drops of segments of the first FTL table;
the threshold constraint comprises a threshold number based on the cadence drop period; and determining that the counter associated with the active drop scheme satisfies the threshold constraint comprises determining that the counter has reached the threshold number.

18. The method of claim 12, wherein the selecting of the active drop scheme from among the multiple drop schemes is based on a round-robin algorithm.

19. The method of claim 12, wherein:

the active drop scheme specifies a drop group size, the drop group size specifying a number of segments to flush to the memory device; and the drop group comprises the number of segments of the first FTL table.

20. A non-transitory computer-readable storage medium comprising instructions that, when executed by a processing device, configure the processing device to perform operations comprising:

tracking multiple drop requests, a drop request from the multiple drop requests being associated with a first drop scheme from among multiple drop schemes, the first drop scheme defining parameters for dropping one or more segments of a first flash translation layer (FTL) table;

selecting the first drop scheme as an active drop scheme based on the drop request being associated with the first drop scheme;

selecting a drop group based on the active drop scheme, the drop group comprising multiple segments of the first FTL table;

flushing the drop group to a memory device; and updating mapping information for the drop group in a second FTL table based on flushing the drop group to the memory device.

\* \* \* \* \*